United States Patent Office 3,037,963
Patented June 5, 1962

3,037,963
RESINOUS MATERIALS
Roger M. Christenson, Richland Township, Pa., assignor to Pittsburgh Plate Glass Company, Allegheny County, Pa., a corporation of Pennsylvania
No Drawing. Filed July 21, 1958, Ser. No. 749,583
15 Claims. (Cl. 260—72)

This invention relates to novel resinous materials and to methods for the preparation thereof, and pertains more particularly to aldehyde substituted amide interpolymers, particularly those which are obtained by reacting an aldehyde with an interpolymer, one component of which is an unsaturated amide.

The recent commercial availability of the versatile monomer, acrylamide,

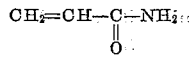

had led to its interpolymerization with a great many other monomeric materials, including methyl acrylate, ethyl acrylate, and butyl acrylate, acrylic acid, acrylonitrile, butadiene-1,3-methyl methacrylate, ethyl methacrylate, butyl methacrylate, styrene, vinyl toluene, and the like. High molecular weight interpolymers containing acrylamide or other unsaturated amides are generally insoluble in most solvents and/or are not easily applied as coating materials. Lower molecular weight interpolymers prepared from an unsaturated amide component are soluble in many solvents, but the film properties of such interpolymers are generally unsatisfactory in that they have poor impact resistance, solvent resistance, chemical resistance, and mar resistance. The use of formaldehyde to introduce methylol ($-CH_2OH$) groups is one method of securing cross-linking and enhanced properties in such interpolymers. However, such methylol-containing interpolymers tend to be unstable on storage, or in use as coating compositions due to the ease with which such cross-linking occurs.

It has now been discovered that extremely useful resinous materials can be obtained from aldehyde-substituted amide interpolymers if at least 50 percent, and preferably 90 percent to 100 percent of the amido groups have a hydrogen atom replaced by groups of the structure $-ROR_1$, wherein R is a lower aliphatic hydrocarbon radical having its connecting valences on a single carbon atom, and $R_1$ is an alkyl or aralkyl radical. The presence of the $-ROR_1$ groups in the interpolymer chain has a tremendous effect upon the stability of the polymer, and makes it possible to prepare coating compositions, and similar materials which possess excellent shelf life. Moreover, the polymers of this type possess outstanding physical properties including toughness, mar resistance and alkali resistance when properly cured. Depending upon the choice of monomers utilized in preparing the polymers, a wide range of polymers, from soft flexible materials to very hard materials, can be readily obtained.

The exact mechanism whereby the amide interpolymers are obtained is not definitely known, but is believed to begin by the formation initially of a relatively short chain soluble interploymer having an approximate structure as follows, acrylamide being utilized for illustrative purposes:

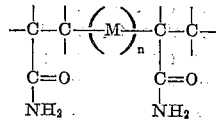

wherein M represents a unit of a monomer or monomers polymerizable with acrylamide, and n represents a whole number greater than 1. For example, if styrene were utilized as the second monomer, M would represent the unit

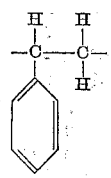

The short chain interpolymer depicted structurally above then reacts with an aldehyde such as formaldehyde, in the presence of an alkanol to give the structure:

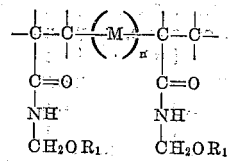

wherein M, n, and $R_1$ have the significance set forth hereinabove.

As indicated above, at least about 50 percent of the $R_1$ groups in the interpolymer chain must be alkyl or aralkyl in order to obtain a stable resinous composition. Those groups which are not alkyl or aralkyl will obviously be hydrogen atoms.

In addition to preparing the resinous compositions by the method described in the foregoing paragraph, that is, by first forming an interpolymer of an unsaturated amide such as acrylamide, and then reacting the interpolymer with an aldehyde such as formaldehyde in the presence of an alcohol, it is also possible to prepare these materials by first reacting the unsaturated amide with the aldehyde and polymerizing the resulting material with other ethylenically unsaturated monomers in the presence of an alcohol. For example, acrylamide and formaldehyde can be reacted to form methylol acrylamide, which in turn can be polymerized with other ethylenically unsaturated monomers and either concurrently, or subsequently be reacted with an alcohol.

Also, N-alkoxyalkyl acrylamides can be prepared by the reaction of acrylamide with an alkanol solution of an aldehyde under mildly acidic conditions, and the resulting N-alkoxyalkyl acrylamide polymerized with other ethylenically unsaturated monomers to give the resinous materials of this invention. Regardless of the method by which they are prepared, the useful products of this invention are all characterized as being interpolymers of unsaturated amides in which at least about 50 percent of the amido groups have a hydrogen atom replaced by groups of the structure —$ROR_1$, wherein R and $R_1$ have the meanings set forth hereinabove.

The ethylenically unsaturated monomeric materials which can be polymerized with unsaturated amides to form useful interpolymers may be any monomer containing a $CH_2=C<$ group, preferably activated by a negative substituent. Included among the useful monomers possessing the $CH_2=C<$ grouping are:

(1) Monoolefinic hydrocarbons, that is, monomers containing only atoms of hydrogen and carbon, such as styrene, alpha-methyl styrene, alpha-ethyl styrene, alpha-butyl styrene, and the like;

(2) Halogenated monoolefinic hydrocarbons, that is, monomers containing carbon, hydrogen and one or more halogen atoms such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, 2-chloropropene-1, 2-chlorobutene-1,2-chloropentene-1, 2-chlorohexene-1, 2-chloroheptene-1, 2-bromobutene - 1, 2-bromoheptene-1, 2-fluorohexene-1, 2 - fluorobutene - 1, 2-iodopropene-1, 2-iodopentene-1, 4-bromoheptene-1, 4-chloroheptene-1, 4-fluoroheptene-1, cis and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-difluoroethylene, 1,1-diiodoethylene, 1,1,2,2-tetrafluoroethylene, 1,1,2,2-tetrachloroethylene, 1-chloro-2,2,2-trifluoroethylene, and the like;

(3) Esters of organic and inorganic acids such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorozenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crontonate, ethyl crotonate and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethylhexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters as well as esters from such alkenyl alcohols beta-ethyl allyl alcohol, beta-propyl allyl alcohol, 1-butene-4-ol, 2-methyl-butene-ol-4, 2(2,2-dimethylpropyl)-1-butene-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, diallyl maleate, dimethyl fumarate, diethyl fumarate, dimethallyl fumarate and diethyl glutaconate;

(4) Organic nitriles such as acrylonitrile, methacrylonitrile, ethacrylonitrile, 3-octenenitrile, crotonitrile, oleonitrile, and the like;

(5) Acid monomers such as acrylic acid, methacrylic acid, crotonic acid, 3-butenoic acid, angelic acid, tiglic acid, and the like;

(6) Monomeric dienes such as butadiene-1,3, 2-methyl butadiene-1,3, 2-chlorobutadiene-1,3, 2-bromobutadiene-1,3, and the like; and (7) Monomeric ketones such as isopropenyl methyl ketone, vinyl methyl ketone, and the like.

In general, it is preferred that the monomer utilized contain a single $CH_2=C<$ group in terminal position, which group is activated by a negative substituent, and an especially preferred group of monomers includes ethyl acrylate, methyl methacrylate, butyl acrylate, ethylhexyl acrylate, styrene, vinyl toluene, and monomethyl styrene.

While acrylamide is the particularly preferred unsaturated amide for use in preparing the resinous compositions of this invention, other unsaturated amides such as methacrylamide, itaconic diamide, maleuric acid, and esters thereof as represented by the formula

wherein R is an alkyl radical, and imide derivatives such as N-carbamyl maleimide of the structure

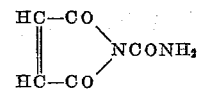

may also be utilized.

It has been found that in those instances where a two component interpolymer prepared from an unsaturated polymerizable amide and a single monomer polymerizable therewith is not completely suitable for further reaction with an aldehyde, useful modification of the interpolymer can usually be obtained by including a third monomer in the interpolymerizable mixture. For example, one useful ternary interpolymer is prepared from acrylamide, ethyl acrylate and styrene. Also, methyl methacrylate tends to improve the hardness of two component interpolymers, and a small quantity of an acid monomer such as acrylic acid, methacrylic acid, crotonic acid, maleic acid and fumaric acid contributes greatly to the adhesion properties of a resin prepared according to the method of this invention. The acid also serves as an internal catalyst, accelerating the cure of films prepared from the interpolymers.

Interpolymers of the unsaturated polymerizable amide with one or more polymerizable monomers are most readily prepared by carrying out the polymerization in a solvent in which the unsaturated polymerizable amide, a white, crystalline solid, and the other monomer/s are soluble at reaction temperature, and under reflux temperatures. Butanol has proven to be a satisfactory solvent in most cases. Isopropyl alcohol, butyl, Cellosolve, and mixtures of butanol or other lower alkanol with water can also be used advantageously as solvents. Some care must be exercised when water is present in the system as gummy precipitates may result, especially with the higher water levels. The presence of lower alcohols or water has been found to moderate the speed of reaction by lowering the reflux temperature. Butyl or ethyl acetate, or other ester solvents, and hydrocarbons such as xylene or mixtures of solvents and the like may also be employed. Mixtures of alcohols and aromatic hydrocarbons are especially useful for this purpose.

In carrying out the polymerization reaction a peroxygen type catalyst is ordinarily utilized. Useful catalysts for this purpose include acetyl benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, dicumyl peroxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions. The diazo compounds such as alpha-alpha-azo-di-isobutyronitrile or p-methoxyphenyl diazothio-(2-naphthyl)ether, may also be used as polymerization catalysts in the preparation of the unsaturated polymerizable amide interpolymers. Redox catalyst systems can also be employed.

The quantity of catalyst employed can be varied considerably; however, in most instances it is desirable to utilize from about 0.1 percent to 2.0 percent by weight of the monomeric components. If high viscosities are desired, a low initial level of catalyst, followed by the necessary additions to get 100 percent conversion, is preferably employed. For low viscosity interpolymers the bulk of the catalyst is added initially and later additions used only to secure desired conversions. Larger amounts of catalyst added initially give lower viscosities.

Since it is desirable that the interpolymers of the unsaturated polymerizable amide with other ethylenically unsaturated monomers be relatively low in molecular weight so that they can be dissolved at high solids and low viscosities, a chain modifying agent or chain terminator is ordinarily added to the polymerization mixture. The use of a lower alkanol such as butanol or a mixture of butanol and water as a solvent, together with high catalyst levels, helps considerably, but in most instances it is preferred to add controlled amounts of chain modifying materials. The mercaptans, such as dodecyl mercaptan, tertiary dodecyl mercaptan, octyl mercaptan, hexyl mercaptan, and the like are conventionally used for this purpose. However, other chain modifying agents such as cyclopentadiene, allyl acetate, allyl carbamate, alpha-methyl styrene dimers, and alpha-methyl styrene itself can be used to secure low molecular weights, as can unsaturated fatty acids or esters. Aromatic hydrocarbons in the reaction mixture also are of assistance in maintaining low molecular weight.

Another method for preparing the unsaturated polymerizable amide interpolymers involves utilization of "block" or "graft" techniques. Conventional polymerization procedures ordinarily result in a random distribution of the components in the interpolymers. By "block" or "graft" methods the components can be introduced into the composition in a regular sequence or order, each segment being of a certain length and periodicity. These products can be made such that the unsaturated polymerizable amide portion is in a fixed position in the composition, this approach involving the preparation of segments with reactive end groups or reactive sites along a preformed backbone from which or to which other segments can be grown or attached. The properties of materials prepared by this relatively new technique are known to be quite different in many instances from interpolymers in which the components are randomly oriented. By the "block" or "graft" method, one can prepare, by choice, materials of different solubility, solvent and flame resistance, adhesion, water solubility, and, in fact, almost any desired property can be "tailored" into the interpolymer.

It is preferred that the aldehyde be reacted with an interpolymer containing from about 5 percent to about 50 percent by weight of the unsaturated polymerizable amide, the balance being the other ethylenically unsaturated monomer/s. It has been found that interpolymers containing the higher levels of the unsaturated polymerizable amide or those monomers which ordinarily form hard homopolymers, give hard and flexible films and consequently can be used as primary film formers, whereas interpolymers containing lower levels or the unsaturated polymerizable amide with those monomers which ordinarily form soft homopolymers tend to be softer and useful as plasticizers for nitrocellulose and similar materials. If more than one ethylenically unsaturated monomer is polymerized with the unsaturated polymerizable amide, the proportions of such additional monomers utilized will depend upon the characteristics which such monomer or monomers will impart to the final interpolymer. For example, in some ternary interpolymer systems it may be desirable to utilize about 20 percent by weight of the unsaturated polymerizable amide, and 40 percent each of two additional monomers such as styrene and butadiene, or in some instances, such as when acrylic acid is one of the monomers utilized, it is desirable that the interpolymer contain about 20 percent of the unsaturated polymerizable amide, about 78 percent of a second ethylenically unsaturated monomer, and only about 2 percent of acrylic acid. The amount of monomers necessary in any interpolymerization reaction can readily be determined by simple experiment.

The polymerization is best carried out by admixing the unsaturated polymerizable amide and the other monomer or monomers, the catalyst and chain modifying agent, if any, in the solvent, and refluxing the resulting solution for a time sufficient to obtain the desired conversion. Ordinarily, the polymerization time will be from about 1 hour to 16 hours. As indicated hereinabove, it may in some instances be desirable to add only a portion of the catalyst initially, the remainder being added in increments as the polymerization progresses. External cooling of the polymerization mixture or very accurate control of reflux conditions is important in carrying out the polymerization because of the very rapid reaction rate. Good agitation is also desirable.

Ordinarily, the monomers and solvent are charged in amounts which would give a solids content of approximately 50 percent based on 100 percent conversion to polymer. However, in the event that the unsaturated polymerizable amide is present in an amount of about 30 percent to 50 percent by weight of the total monomer charge, the monomers and solvent should be proportioned to give a solids content of about 30 percent or less in order to prevent the formation of a gel, especially upon reaction with formaldehyde. In such cases, a portion of the solvent can be evaporated after polymer formation is complete in order to give any desired solids content.

As indicated hereinabove, the interpolymers of an unsaturated polymerizable amide prepared according to the method disclosed herein, are readily soluble in inexpensive organic solvents but are substantially water insoluble, this latter property being exceedingly important in the preparation of coating compositions.

The useful resinous materials of the present invention are obtained by reacting the interpolymers prepared according to the methods described above with an aldehyde and either an alkanol or an aralkanol in such a manner that at least about 50 percent of the amido groups have a hydrogen atom replaced by $—ROR_1$ groups, wherein each R is an aliphatic hydrocarbon radical, preferably an alkylene radical, having its connecting valences on a single carbon atom, and $R_1$ is an alkyl radical or an aralkyl radical. Formaldehyde, in the form of an alcohol solution thereof, or a formaldehyde yielding substance such as paraformaldehyde or trioxymethylene, is preferred. However, other monoaldehydes, that is, aldehydes containing a single aldehyde (—CHO) group, and preferably containing only atoms of carbon, hydrogen, and oxygen, including acetaldehyde, butyraldehyde, furfural, and the like, can also be used. Aldehydes containing two or more aldehyde groups, such as glyoxal, are unsatisfactory and should not be used inasmuch as they cause gel formation when reacted with amide interpolymers.

It is preferred that the alcohol utilized be butanol. However, other alkanols, including methanol, ethanol, propanol, pentanol, hexanol, heptanol, and octanol, as well as higher alkanols including those containing up to about 12 carbon atoms can also be employed. Likewise,

EXAMPLES I TO VIII

These examples illustrate the preparation of the interpolymers containing acrylamide. In each example butanol was utilized as a solvent and cumene hydroperoxide as a catalyst. The polymerization was carried out by admixing the monomers in the butanol and adding one half of the catalyst thereto. The mixture was then refluxed for two hours, and one half of the remaining catalyst added. The mixture was again refluxed for two hours and the remaining catalyst added. After an additional two hours of refluxing, substantially 100 percent conversion to interpolymer was obtained. The pertinent data are set forth in the following table:

| Example | Composition | | | | Preparation | | | Properties | | | |
|---|---|---|---|---|---|---|---|---|---|---|---|
| | Percent acrylamide | Percent ethyl acrylate | Percent styrene | Percent vinyl toluene | Percent reactive monomers in butanol | Percent[1] tertiary dodecyl mercaptan | Percent[1] catalyst | Percent solids | Gardner viscosity | Gardner-holdt color | Water[2] solubility |
| I | 15 | 85 | | | 47.5 | 1 | 2 | 45.8 | Z2 | 4-5 | 0.124 |
| II | 25 | 75 | | | 30.0 | 2 | 2 | 28.2 | A— | 1-2 | 0.152 |
| III | 15 | | | 85 | 47.5 | 1 | 2 | 46.5 | Z3— | 2-3 | 0.110 |
| IV | 25 | | | 75 | 30.0 | 2 | 4 | 26.9 | A | 2-3 | 0.095 |
| V | 35 | | | 65 | 30.0 | 2 | 4 | 27.2 | B— | 2-3 | 0.187 |
| VI | 15 | 45 | 40 | | 50.0 | 1 | 2 | 48.5 | U-W | 5-6 | 0.220 |
| VII | 25 | 40 | 35 | | 50.0 | 2 | 2 | 50.0 | Z1— | 3-4 | 0.251 |
| VIII | 35 | 35 | 30 | | 30.0 | 2 | 4 | 28.6 | A— | 4-5 | 0.378 |

[1] Based on reactive monomers present.
[2] The solubility test was carried out by drying a sample of the resin to a powder and placing a weighed amount of this resin and a weighed amount of water into a bottle which was then rotated in a water bath at 25° C. for 16 hours. The water was then filtered and a solids analysis carried out to determine how much polymer had dissolved (grams per 100 grams of solution).

aralkanols such as benzyl alcohol can be utilized with good results.

It is ordinarily preferred to utilize two equivalents of formaldehyde for each amide group present in the interpolymer. However, this ratio may be raised or lowered considerably if desired. For example, the ratio may be as high as about 3.0 equivalents of formaldehyde for each amide group in the interpolymer, or as low as about 0.3 equivalent of formaldehyde for each amide group in the interpolymer. Some of the formaldehyde utilized may be consumed in a side reaction producing a dialkyl formal.

The reaction is preferably carried out in the presence of a mild acid catalyst such as maleic anhydride. Other acid catalysts such as oxalic acid, hydrochloric acid, or sulfuric acid, may also be utilized with good results. The quantity of catalyst employed may be varied widely; however, in general, it is preferred to utilize from about 0.2 percent to 1.0 percent by weight of catalyst, based upon the weight of the amide interpolymer which is reacted with the aldehyde.

The reaction of the amide interpolymer with the aldehyde can be carried out simply by adding the aldehyde and catalyst (if one is utilized) to the polymerization mixture obtained by polymerizing the amide and one or more ethylenically unsaturated monomers, and refluxing the resultant mixture for a period of from about 3 to 5 hours or until a desired viscosity or solids content is obtained. The water of condensation can be removed by azeotropic distillation as may a portion of the solvent if desired. Preferably, the final resinous material will have a solids content of about 20 percent to 70 percent and a Gardner viscosity of about H to $Z_4$ at 50 percent solids content.

The following examples illustrate in detail the preparation of resinous materials by the reaction of aldehydes with interpolymers of unsaturated polymerizable amides and ethylenically unsaturated monomers, and the use of the resulting resinous materials as film forming compositions. The examples are not intended to limit the invention, however, for there are, of course, numerous possible variations and modifications.

It is apparent from the foregoing table that interpolymers containing the polymerizable unsaturated amides are substantially water insoluble, particularly when prepared from comonomers of limited water solubility. This is in direct contrast to polyamides, many of which are quite soluble in water.

When the foregoing examples are repeated substituting vinyl toluene for the styrene, substantially equivalent results are obtained.

EXAMPLES IX TO XVII

A series of resinous condensation products was prepared by first polymerizing acrylamide with ethyl acrylate to form an interpolymer, and subsequently condensing said interpolymer with formaldehyde. In preparing the ethyl acrylate-acrylamide interpolymer, the entire amount of catalyst was added at the start of the polymerization reaction except in Example IX, wherein the catalyst was added in two increments, half of the catalyst being added initially and half mid-way during the polymerization reaction. In each run a conversion of substantially 100 percent was obtained. The solvent for the final product was butanol in each instance.

The polymerization charge and polymerization procedure, interpolymer properties, the formaldehyde condensation procedure, the properties of the resinous condensation product and the films prepared therefrom are all set forth in the following table. In the table, the letters utilized have the following significance:

A—Benzoyl peroxide
B—Butanol
C—Cumene hydroperoxide
D—Alpha-methyl styrene dimers
E—Dodecyl mercaptan
F—Isopropanol
G—Tertiary dodecyl mercaptan
H—$H_2O$
I—Di-t-butyl peroxide

|   | Example IX | Example X | Example XI | Example XII | Example XIII | Example XIV | Example XV | Example XVI | Example XVII |
|---|---|---|---|---|---|---|---|---|---|
| Polymerization charge and procedure: | | | | | | | | | |
| Acrylamide | 125 grams | 62.5 grams | 62.5 grams | 50 grams | 50 grams | 50 grams | 250 grams | 50 grams | 250 grams |
| Ethyl acrylate | 375 grams | 187.5 grams | 187.5 grams | 150 grams | 150 grams | 150 grams | 750 grams | 150 grams | 750 grams |
| Catalyst | 7.5 A grams | 2.5 C grams | 2.5 I grams | 2 C grams | 2 C grams | 2 C grams | 10 C grams | 2 C grams | 10 C grams |
| Modifier | | | | 2 E grams | 2 D grams | 6 D grams | 10 E grams | 4E–10H grams | 10 E grams |
| Solvent: Butanol | 600 grams | 250 grams | 250 grams | 200 grams | 200 grams | 200 grams | 1,000 grams | 190 grams | 1,000 grams |
| Xylene | | | 125 grams | | | | | | |
| Reflux time | 6 hours | 1 hour | 1 hour | 2 hours | 4 hours | 3 hours | 10 minutes | 4 hours | 10 minutes |
| Polymer properties: | | | | | | | | | |
| Percent solids | 46.8 | 49.6 | 40.9 | 52.2 | | | | | |
| Viscosity (Gardner) | 1 hour | 44 minutes | >1 hour | 15 minutes | | Very viscous | Very viscous | | Very viscous |
| Formaldehyde condensation: | | | | | | | | | |
| Butanol solution of formaldehyde | 264 grams | 125 B grams. 132 grams | 132 grams | 106 grams | 106 grams | 106 grams | 530 grams | 106 grams | 530 grams |
| Maleic anhydride | 3.6 grams | 1.7 grams | 1.7 grams | 1.4 grams | 1.4 grams | 1.4 grams | 7.0 grams | 1.4 grams | 7.0 grams |
| Reflux time | 2 hours | 20 minutes | 20 minutes | 1½ hours | 1½ hours | 15 minutes | 10 minutes | 3 hours | 10 minutes |
| Final product: | | | | | | | | | |
| Percent solids | 39.6 | 36.5 | 37.0 | 48.5 | 47.9 | 48.8 | 43.8 | 50.2 | 43.8 |
| Viscosity (Gardner) | Z1 | Z2 | Z3–Z6 | Z–Z1 | Z5 | Z4 | Z3 | U | Z2–Z3 |
| Color (Gardner) | 4–5 | <1 | <1 | <1 | 1–2 | >1 | >1 | 1 | >1 |
| Film properties: | | | | | | | | | |
| Sward hardness | 22 | 26 | 20 | 28 | 24 | 24 | 22 | 24 | 22 |
| Impact resistance | >48 | >48 | >48 | >48 | >48 | >48 | >48 | <48 | >48 |
| Percent flexibility | 20 | >20 | >20 | >20 | >20 | >20 | >20 | >20 | >20 |
| Alkali resistance | | | | | | | | >32 hours | |
|   | 2 hours | 2 hours | 2–16 hours | 2 hours | 2½ hours | 2½ hours | 2½ hours | >48 hours | 2½ hours |

EXAMPLES XVIII TO XXIII

In accordance with these examples, interpolymers of the acrylamide with one or more of the ethylenically unsaturated monomers disclosed hereinabove were prepared and condensed with formaldehyde to give useful resinous condensation products.

The polymerization in each example is carried out by admixing the polymerizable components with a chain transfer agent (if one was utilized) in a solvent such as butanol or xylene, and adding the polymerization catalyst, either initially or in increments throughout the polymerization reaction. The polymerization mixture was then refluxed (in a bomb when butadiene-1,3 was the monomer) for a period of time sufficient to obtain a conversion of substantially 100 percent. The polymerization charge, reflux time, interpolymer properties, formaldehyde condensation procedure, and properties of the resinous condensation product and films thereof are reported in the following table:

EXAMPLE XXXIV

An interpolymer containing 15 percent acrylamide, 40 percent styrene and 45 percent ethyl acrylate was prepared in butanol according to the method of Example VI. The resulting interpolymer was then reacted with glyoxal in accordance with the method utilized in Examples XVIII to XXIII. However, after only a few minutes of refluxing of the glyoxal-interpolymer mixture, a gel formed.

In addition to being useful film forming materials, the resinous condensation products of the present invention are useful for many other purposes. For example, they have been found to be compatible with many other resinous materials including most alkyd resins, epoxy resins and epoxidized oils, nitrocellulose, urea and melamine resins, and the like. The condensation products per se, or the compositions obtained by blending them with other of the materials described above, are in turn useful as molding compounds and as laminating materials.

|   | Example XVIII | Example XIX | Example XX | Example XXI | Example XXII | Example XXIII |
|---|---|---|---|---|---|---|
|   | 50% acrylamide, (A) 25% methyl methacrylate, (B) 60% ethyl acrylate | 20% acrylamide, (A) 20% methyl methacrylate, (B) 60% ethyl acrylate | 15% acrylamide, (A) 25% styrene, (B) 60% ethyl acrylate | 20% acrylamide, (A) 40% styrene, (B) 40% butadiene | 20% acrylamide, (A) 40% styrene, (B) 40% butadiene | 20% acrylamide, (A) 80% vinyl toluene |
| Polymerization charge and procedure: | | | | | | |
| Acrylamide | 3 lbs | 40 grams | 3 lbs | 160 grams | 160 grams | 250 grams |
| Monomer A | 5 lbs | 40 grams | 5 lbs | 320 grams | 320 grams | 1,000 grams |
| Monomer B | 12 lbs | 120 grams | 12 lbs | 320 grams | 320 grams | |
| Catalyst | 90.8 C grams | 2 A grams | {90.8 C grams, 90.8 A grams} | 16.0 I grams | 16.0 I grams | 25.0 A grams |
| Modifier | 90.8 G grams | 2 D grams | 90.8 G grams | 8.0 E grams | 8.0 E grams | |
| Solvent: | | | | | | |
| Butanol | 20.0 lbs | 200 grams | 20.0 lbs | 1,200 grams | 1,200 grams | 1,250 grams |
| Xylene | | | | 500 grams | 500 grams | |
| Reflux Time | 4 hours | 1 hour | 6 hours | 16 hours (bomb) | 16 hours (bomb) | 10 hours |
| Polymer properties: | | | | | | |
| Percent solids | 52.5 | 51.6 | 51.5 | 25.1 | 25.1 | 49.1 |
| Viscosity (Gardner) | Z3 | Z5–Z6 | Z | | | Z4–Z5 |
| Formaldehyde condensation: | | | | | | |
| Butanol solution of formaldehyde | 6.34 lbs | 84.6 grams | 6.34 lbs | 339 grams | 339 grams | 75/351 grams resin |
| Maleic Anhydride | 36.3 grams | 1.0 grams | 36.3 grams | 4.5 grams | 4.5 grams | 1.0 grams |
| Reflux Time | 3 hours | 3½ hours | 3 hours | 4 hours | 4 hours | 16 hours |
| Final product: | | | | | | |
| Percent solids | 50.1 | 48.95 | 50.6 | 49.4 | 49.4 | 41.3 |
| Viscosity (Gardner) | Y | Y | U–V | Z | Z | Z–Y |
| Color (Gardner) | 3–4 | <1 | 3–4 | 3–4 | 3–4 | 1–2 |
| Film properties: | | | | | | |
| Sward hardness | 20 | 22 | 28 | 34 | 34 | 42 |
| Impact resistance | >96 | >48 | >96 | >48 | >48 | <1 |
| Percent flexibility | >20 | >20 | >20 | >20 | >20 | <2.5 |
| Alkali resistance 3% | | 24 hours | | >72 hours | >72 hours | >72 hours |

Also, the amide interpolymer-aldehyde condensation products can be reacted with diisocyanates to form useful materials.

Films of the resinous condensation products of this invention cure readily at temperatures of about 300° F. and above without catalyst to give hard, tough films. If catalysts such as phosphoric acid are used, cures as low at 200° F. for clear films, and 250° F. for pigmented films, can be used. The effect of varying temperatures, with and without a catalyst, upon the cure of the resinous condensation products is illustrated in the following table wherein a condensation product of formaldehyde with an interpolymer containing 15 percent acrylamide, 25 percent methyl methacrylate, and 60 percent ethyl acrylate, was used for illustrative purposes.

| Catalyst | 30 minute cure temperature, °F. | Sward hardness | Impact resistance (inch-pounds) | Water resistance (48 hours) |
|---|---|---|---|---|
| None | 200 | 4 | 32 | Soft—White. |
| Do | 250 | 8 | >48 | Soft. |
| Do | 300 | 16 | >48 | Hard—Clear. |
| Do | 350 | 28 | >48 | Do. |
| Do | 400 | 30 | >48 | Do. |
| Do | 200 | 4 | 32 | 2 hours White—Soft. |
| 0.5 percent phosphoric acid | 200 | 10 | >48 | 24 hours hard—Clear. |
| 0.5 percent morpholine salt of p-toluene-sulfonic acid | 200 | 10 | 38 | 2 hours white—Soft. |
| 0.5 percent p-toluene-sulfonic acid | 200 | 12 | >48 | 24 hours hard—Clear. |
| None | 250 | 8 | 44 | 2-24 hours—Soft. |
| 0.5 percent phosphoric acid | 250 | 20 | >48 | 24 hours hard—Clear. |
| 0.5 percent morpholine salt of p-toluene-sulfonic acid | 250 | 22 | >48 | Soft 24 hours. |
| 0.5 percent p-toluene-sulfonic acid | 250 | 22 | 38 | 24 hours hard—Clear. |
| None | 300 | 16 | >48 | Do. |
| 0.5 percent phosphoric acid | 300 | 26 | >48 | Do. |
| 0.5 percent morpholine salt of p-toluene-sulfonic acid | 300 | 26 | 24 | Do. |
| 0.5 percent p-toluene-sulfonic acid | 300 | 22 | 26 | Do. |

Pigmented compositions in general require higher bakes than clear films to secure good cures. Grinds of titanium dioxide in a copolymer containing 15 percent acrylamide, 25 percent styrene and 60 percent ethyl acrylate, the interpolymer being condensed with formaldehyde, were prepared and were let down with repeat batches of the same composition to give three compositions containing 40 percent solids in which the pigment level (based on solids) was 47 percent, 38 percent, 19 percent respectively. Draw downs on steel panels with a 0.003 inch draw bar were made which deposited a film of about 1 mil thickness. The following table illustrates that exceptionally good physical properties can be obtained with such highly pigmented films. Gloss was excellent in all cases and no yellowing occurred when the films were cured at 350° F.

| TiO₂ pigment level (percent) | Catalyst | 30 minute cure temperature, °F. | Sward hardness | Impact resistance (inch-pounds) |
|---|---|---|---|---|
| 47 | None | 350 | 26 | 48 |
| 47 | 0.5 percent phosphoric acid | 275 | 22 | 96 |
| 38 | None | 350 | 26 | 96 |
| 38 | 0.5 percent phosphoric acid | 250 | 24 | 96 |
| 19 | None | 350 | 28 | 96 |
| 19 | 0.5 percent phosphoric acid | 250 | 26 | 96 |

The resinous condensation products of the present invention form particularly useful blends with epoxy resins, that is, such as the resinous polyglycidyl ethers prepared by reacting epichlorohydrin with 2,2-bis(4-hydroxyphenyl)propane. It has been found that most epoxy resins are compatible with the amide interpolymer-formaldehyde condensates, although relatively strong solvents may be necessary to obtain compatibility when the higher molecular weight epoxy resins are utilized. To illustrate the superior film properties obtained by blending the amide interpolymer-formaldehyde condensates with epoxy resins, an interpolymer containing 60 percent ethyl acrylate, 25 percent styrene, and 15 percent acrylamide was condensed with formaldehyde. The resulting polymer was then blended with epoxy resins of varying molecular weights, the interpolymer comprising 75 percent by weight and the epoxy resins 25 percent by weight of the total resin solids. The baking temperatures and film properties are set forth below:

| Epoxy resin epoxide equivalent | 30 minute cure temperature, °F. | Sward hardness | Impact resistance (inch-pounds) | Solvent | Film appearance | Alkali resistance (hours) |
|---|---|---|---|---|---|---|
| 190–210 | 350 | 10 | 44 | Butanol-methyl ethyl ketone | Clear | 100 |
| 190–210 | 400 | 32 | >48 | do | do | 100 |
| 190–210 | ¹ 350 | 22 | >48 | Methyl ethyl ketone | do | 40 |
| 300–375 | 350 | 28 | | Butanol-methyl ethyl ketone | do | 100 |
| 300–375 | 400 | 44 | >48 | do | Clear slightly yellow | 100 |
| 300–375 | ¹ 350 | 26 | >48 | Methyl ethyl ketone | Clear | 100 |
| 450–525 | 300 | 38 | | Butanol-cellosolve acetate-toluene | do | 100 |
| 450–525 | 350 | 46 | | do | do | 100 |
| 450–525 | 400 | 46 | 30 | do | Clear slightly yellow | 100 |
| 450–525 | ¹ 300 | 46 | >96 | Toluene | Clear | 100 |
| 870–1025 | 300 | 44 | | Butanol-cellosolve acetate-toluene | do | 100 |
| 870–1025 | 350 | 56 | | do | do | 100 |
| 870–1025 | 400 | 48 | >96 | do | Clear slightly yellow | 100 |
| 870–1025 | ¹ 300 | 36 | >96 | Toluene | Clear | 100 |

¹ Plus phosphoric acid—0.5 percent based on total resin solids.

The resinous condensation products of this invention can also be plasticized with various materials such as the epoxidized oils, tricresyl phosphate, blown castor oil, and the like. For example, a condensation product prepared by the reaction of formaldehyde with an 80 percent styrene-15 percent acrylamide interpolymer was admixed with varying amounts of an epoxidized oil plasticizer (sold commercially as Admex 710), and films of the plasticized composition applied to metal sheets and baked. The pertinent data are recorded below:

| Percent resinous condensate | Percent plasticizer | 30 minute cure temperature, °F. | Solution appearance | Film appearance | Sward hardness | Impact resistance (inch-pounds) | Flexibility percent |
|---|---|---|---|---|---|---|---|
| 90 | 10 | 300 | Clear | Clear | 54 | ------ | ------ |
| 75 | 25 | 300 | ----do---- | ----do---- | 24 | ------ | >20 |
| 50 | 50 | 300 | ----do---- | ----do---- | Tacky | 48 | >20 |
| 90 | 10 | 400 | ----do---- | Slightly yellow | 50 | ------ | >20 |
| 75 | 25 | 400 | ----do---- | ----do---- | 42 | 48 | >20 |
| 50 | 50 | 400 | ----do---- | Dark yellow | 24 | 48 | >20 |
| 90 | 10 | [1] 300 | ----do---- | Clear | 44 | ------ | >20 |
| 75 | 25 | [1] 300 | ----do---- | ----do---- | 42 | 48 | >20 |
| 50 | 50 | [1] 300 | ----do---- | ----do---- | ------ | 48 | >20 |

[1] Plus phosphoric acid—0.5 percent based on total resin solids.

In order to illustrate the importance of having at least about 50 percent of the amido groups with a hydrogen atom replaced by —$ROR_1$ groups, wherein R and $R_1$ have the meanings set forth hereinabove, a series of interpolymers was prepared having the same proportions of styrene to ethyl acrylate to acrylamide as Example VI, except that the quantity of $R_1$ alkyl groups in the radical —$ROR_1$ was intentionally varied from 0 percent to 100 percent. Samples of these resins were then stored at temperatures of 78° F. and 140° F., both in the presence and absence of a phosphoric acid catalyst, and observed periodically to determine the stability thereof. The stability data are recorded in the following table:

| Sample number | Percent butylation | Percent phosphoric acid catalyst | Temperature °F. | Gelation time |
|---|---|---|---|---|
| 1 | 100 | 0 | 78 | No gel in 5 weeks. |
| 2 | 100 | 0 | 140 | Do. |
| 3 | 100 | 1 | 78 | Do. |
| 4 | 100 | 1 | 140 | Do. |
| 5 | 95–100 | 0 | 78 | Do. |
| 6 | 95–100 | 0 | 140 | Do. |
| 7 | 95–100 | 1 | 78 | Do. |
| 8 | 95–100 | 0 | 140 | Do. |
| 9 | 90 | 0 | 78 | Do. |
| 10 | 90 | 0 | 140 | Do. |
| 11 | 90 | 1 | 78 | Do. |
| 12 | 90 | 1 | 140 | Do. |
| 13 | 50 | 0 | 78 | Do. |
| 14 | 50 | 1 | 78 | Do. |
| 15 | 10 | 0 | 140 | 2 days. |
| 16 | 10 | 1 | 78 | 1 day. |
| 17 | 10 | 1 | 140 | 8 hours. |
| 18 | 0 | 0 | 78 | 9 days. |
| 19 | 0 | 0 | 140 | 1 day. |
| 20 | 0 | 1 | 78 | 1 hour. |
| 21 | 0 | 1 | 140 | Gelled before heating. |

It is obvious from the results set forth in the above table that practical stability can be obtained only if the percent of alcoholation is 50 or above. Moreover, it has been found that similar results are obtained when other akanols such as methanol, propanol, or pentanol are substituted for the butanol.

This application is a continuation-in-part of copending application, Serial No. 584,473, filed May 14, 1956, which in turn is a continuation-in-part of abandoned application, Serial No. 490,409, filed February 24, 1955.

I claim:

1. A thermosetting, ungelled, water insoluble resinous composition comprising an interpolymer of monomers consisting essentially of an unsaturated amide selected from the class consisting of acrylamide, methacrylamide, itaconic diamide, maleuric acid, alkyl esters of maleuric acid and N-carbamyl maleimide, with at least one other monomer containing a terminal $CH_2$=C< group, said interpolymer containing from about 5 percent to 50 percent of said amide, substantially all of the nitrogen atoms in said interpolymer being trivalent nitrogen atoms, said interpolymer being characterized by having at least about 50 percent of the amido groups thereof having a hydrogen atom replaced by the structure

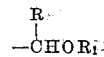

wherein R is a member of the class consisting of hydrogen, furyl, and a saturated lower aliphatic hydrocarbon radical, and $R_1$ is a member of the class consisting of alkyl radicals containing from about 1 to 12 carbon atoms, and benzyl radicals.

2. A thermosetting, ungelled, water insoluble resinous composition comprising an interpolymer of monomers consisting essentially of acrylamide, ethyl acrylate and styrene, said interpolymer containing from about 5 percent to 50 percent of acrylamide, substantially all of the nitrogen atoms in said interpolymer being trivalent nitrogen atoms, said interpolymer being characterized by having at least about 50 percent of the amido groups thereof having a hydrogen atoms replaced by the structure

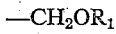

wherein $R_1$ is lower alkyl.

3. A thermosetting, ungelled, water insoluble resinous composition comprising an interpolymer of monomers consisting essentially of acrylamide, ethyl acrylate and vinyl toluene, said interpolymer containing from about 5 percent to 50 percent of acrylamide, substantially all of the nitrogen atoms is said interpolymer being trivalent nitrogen atoms, said interpolymer being characterized by having at least about 50 percent of the amido groups thereof having a hydrogen atoms replaced by the structure

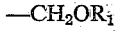

wherein $R_1$ is lower alkyl.

4. A thermosetting, ungelled, water insoluble resinous composition comprising an interpolymer of monomers consisting essentially of acrylamide and vinyl toluene, said interpolymer containing from about 5 percent to 50 percent of acrylamide, substantially all of the nitrogen atoms in said interpolymer being trivalent nitrogen atoms, said interpolymer being characterized by having at least about 50 percent of the amido groups thereof having a hydrogen atom replaced by the structure

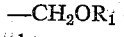

wherein $R_1$ is lower alkyl.

5. A thermosetting, ungelled, water insoluble resinous composition comprising an interpolymer of monomers consisting essentially of acrylamide, ethyl acrylate and methyl methacrylate, said interpolymer containing from about 5 percent to 50 percent of acrylamide, substantially all of the nitrogen atoms in said interpolymer being trivalent nitrogen atoms, said interpolymer being characterized by having at least about 50 percent of the amido groups thereof having a hydrogen atom replaced by the structure

—CH₂OR₁ wherein R₁ is lower alkyl.

6. A thermosetting, ungelled, water insoluble resinous composition comprising an interpolymer of monomers consisting essentially of acrylamide, styrene and butadiene-1,3, said interpolymer containing from about 5 percent to 50 percent of acrylamide, substantially all of the nitrogen atoms in said interpolymer being trivalent nitrogen atoms, said interpolymer being characterized by having at least about 50 percent of the amido groups thereof having a hydrogen atom replaced by the structure

—CH₂OR₁ wherein R₁ is lower alkyl.

7. The method of preparing a thermosetting, ungelled, water insoluble, film-forming resinous condensation product which comprises refluxing formaldehyde with a substantially water insoluble interpolymer of monomers consisting essentially of an unsaturated amide selected from the class consisting of acrylamide, methacrylamide, itaconic diamide, maleuric acid, alkyl esters of maleuric acid, and N-carbamyl maleimide, with at least one other monomer containing a terminal $CH_2{=}C{<}$ group, said interpolymer containing from about 5 percent to 50 percent of said amide, substantially all of the nitrogen atoms in said interpolymer being trivalent nitrogen atoms, said refluxing of said interpolymer and formaldehyde being carried out in admixture with a member of the class consisting of an alkanol containing from about 1 to 12 carbon atoms, and benzyl alcohol, and an acid catalyst selected from the class consisting of carboxylic acids and mineral acids, there being present in the admixture from 0.2 equivalent to 3.0 equivalents of formaldehyde for each amide group in said interpolymer, the resinous condensation product resulting from said refluxing step being characterized by having at least about 50 percent of the amido groups thereof having a hydrogen atom replaced by the structure

—CH₂OR₁ wherein R₁ is a member of the class consisting of alkyl radicals containing from about 1 to 12 carbon atoms, and benzyl radicals.

8. The method of preparing a thermosetting, ungelled, water insoluble, film-forming resinous condensation product which comprises refluxing formaldehyde with a substantially water insoluble interpolymer of monomers consisting essentially of acrylamide, ethyl acrylate and styrene, said interpolymer containing from about 5 percent to 50 percent of acrylamide, substantially all of the nitrogen atoms in said interpolymer being trivalent nitrogen atoms, said refluxing of said interpolymer and formaldehyde being carried out in admixture with lower alkanol and an acid catalyst selected from the class consisting of carboxylic acids and mineral acids, there being present in the admixture from 0.2 equivalent to 3.0 equivalents of formaldehyde for each amide group in said interpolymer, the resinous condensation product resulting from said refluxing step being characterized by having at least about 50 percent of the amido groups thereof having a hydrogen atom replaced by the structure

—CH₂OR₁ wherein R₁ is lower alkyl.

9. The method of preparing a thermosetting, ungelled, water insoluble, film-forming resinous condensation product which comprises refluxing formaldehyde with a substantially water insoluble interpolymer of monomers consisting of essentially of acrylamide, ethyl acrylate and vinyl toluene, said interpolymer containing from about 5 percent to 50 percent of acrylamide, substantially all of the nitrogen atoms in said interpolymer being trivalent nitrogen atoms, said refluxing of said interpolymer and formaldehyde being carried out in admixture with lower alkanol and an acid catalyst selected from the class consisting of carboxylic acids and mineral acids, there being present in the admixture from 0.2 equivalent to 3.0 equivalents of formaldehyde for each amide group in said interpolymer, the resinous condensation product resulting from said refluxing step being characterized by having at least about 50 percent of the amido groups thereof having a hydrogen atom replaced by the structure

—CH₂OR₁ wherein R₁ is lower alkyl.

10. The method of preparing a thermosetting, ungelled, water insoluble, film-forming resinous condensation product which comprises refluxing formaldehyde with a substantially water insoluble interpolymer of monomer consisting essentially of acrylamide and vinyl toluene, said interpolymer containing from about 5 percent to 50 percent of acrylamide, substantially all of the nitrogen atoms in said interpolymer being trivalent nitrogen atoms, said refluxing of said interpolymer and formaldehyde being carried out in admixture with lower alkanol and an acid catalyst selected from the class consisting of carboxylic acids and mineral acids, there being present in the admixture from 0.2 equivalent to 3.0 equivalents of formaldehyde for each amide group in said interploymer, the resinous condensation product resulting from said refluxing step being characterized by having at least about 50 percent of the amido groups thereof having a hydrgoen atom replaced by the structure

—CH₂OR₁ wherein R₁ is lower alkyl.

11. The method of preparing a thermosetting, ungelled, water insoluble, film-forming resinous condensation product which comprises refluxing formaldehyde with a substantially water insoluble interpolymer of monomers consisting essentially of acrylamide, ethyl acrylate and methyl methacrylate, said interpolymer containing from about 5 percent to 50 percent of acrylamide, substantially all of the nitrogen atoms in said interpolymer being trivalent nitrogen atoms, said refluxing of said interpolymer and formaldehyde being carried out in admixture with lower alkanol and an acid catalyst selected from the class consisting of carboxylic acids and mineral acids, there being present in the admixture from 0.2 equivalent to 3.0 equivalents of formaldehyde for each amide group in said interpolymer, the resinous condensation product resulting from said refluxing step being characterized by having at least about 50 percent of the amido groups thereof having a hydrogen atom replaced by the structure

—CH₂OR₁ wherein R₁ is lower alkyl.

12. The method of preparing a thermosetting, ungelled, water insoluble, film-forming resinous condensation product which comprises refluxing formaldehyde with a substantially water insoluble interpolymer of monomers consisting essentially of acrylamide, styrene and butadiene-1,3, said interpolymer containing from about 5 percent to 50 percent of acrylamide, substantially all of the nitrogen atoms in said interpolymer being trivalent nitrogen atoms, said refluxing of said interpolymer and formaldehyde being carried out in admixture with lower alkanol and an acid catalyst selected from the class consisting of carboxylic acids and mineral acids, there being present in the admixture from 0.2 equivalent to 3.0 equivalents of formaldehyde for each amide group in said interpolymer, the resinous condensation product resulting from said refluxing step being characterized by having at least about 50 percent of the amido groups thereof having a hydrogen atom replaced by the structure

—CH$_2$OR$_1$ wherein R$_1$ is lower alkyl.

13. A thermosetting, ungelled, water insoluble resinous composition comprising an interpolymer of monomers consisting essentially of acrylamide, a lower alkyl acrylate, and styrene, said interpolymer containing from about 5 percent to 50 percent of acrylamide, substantially all of the nitrogen atoms in said interpolymer being trivalent nitrogen atoms, said interpolymer being further characterized by having at least about 50 percent of the amido groups thereof having a hydrogen atom replaced by the structure

—CH$_2$OR$_1$ wherein R$_1$ is lower alkyl.

14. The method of preparing a thermosetting, ungelled, water insoluble, film-forming resinous condensation product which comprises refluxing formaldehyde with a substantially water insoluble interpolymer of monomers consisting essentially of acrylamide, a lower alkyl acrylate, and styrene, said interpolymer containing from about 5 percent to 50 percent of acrylamide, substantially all of the nitrogen atoms in said interpolymer being trivalent nitrogen atoms, said refluxing of said interpolymer and formaldehyde being carried out in admixture with a lower alkanol and an acid catalyst selected from the class consisiting of carboxylic acids and mineral acids, there being present in the admixture from 0.2 equivalent to 3.0 equivalents of formaldehyde for each amide group in said interpolymer, the resinous condensation product resulting from said refluxing step being characterized by having at least about 50 percent of the amido groups thereof having a hydrogen atom replaced by the structure

—CH$_2$OR$_1$ wherein R$_1$ is lower alkyl.

15. An article having a metallic surface having as a coating thereon a hardened film of the resinous composition of claim 1.

References Cited in the file of this patent

UNITED STATES PATENTS

| 2,173,005 | Strain | Sept. 12, 1939 |
| 2,808,383 | Fikentscher et al. | Oct. 1, 1957 |
| 2,810,713 | Melamed | Oct. 22, 1957 |
| 2,839,514 | Shokal et al. | June 17, 1948 |

FOREIGN PATENTS

| 467,492 | Great Britain | June 11, 1937 |

REEXAMINATION CERTIFICATE (335th)

United States Patent [19]

Christenson

[11] B1 3,037,963

[45] Certificate Issued Apr. 16, 1985

[54] RESINOUS MATERIALS

[75] Inventor: Roger M. Christenson, Richland Township, Allegheny County, Pa.

[73] Assignee: Pittsburgh Plate Glass Company, Allegheny County, Pa.

Reexamination Request:
No. 90/000,468, Nov. 14, 1983

Reexamination Certificate for:
Patent No.: 3,037,963
Issued: Jun. 5, 1962
Appl. No.: 749,583
Filed: Jul. 21, 1958

Related U.S. Application Data

[63] Continuation-in-part of Ser. No. 584,473, May 14, 1956, which is a continuation-in-part of Ser. No. 490,409, Feb. 24, 1955, abandoned.

[51] Int. Cl.³ .......................... C08F 8/28; C08L 61/20
[52] U.S. Cl. .................................. 525/154; 525/156; 525/385; 525/386; 526/301; 526/304; 526/306
[58] Field of Search .................... 260/80.5, 86.1, 88.1, 260/72, 73, 80.7, 45.5 MP; 117/132; 525/154, 156, 385, 386, 301, 304, 306

[56] References Cited

U.S. PATENT DOCUMENTS

| | | | |
|---|---|---|---|
| 2,870,116 | 1/1959 | Vogel et al. | 260/45.5 |
| 2,870,117 | 1/1959 | Vogel et al. | 260/45.5 |
| 2,978,437 | 4/1961 | Christenson | 260/72 |

*Primary Examiner*—Theodore Pertilla

EXEMPLARY CLAIM

1. A thermosetting, ungelled, water insoluble resinous composition comprising an interpolymer of monomers consisting essentially of an unsaturated amide selected from the class consisting of acrylamide, methacrylamide, itaconic diamide, maleuric acid, alkyl esters of maleuric acid and N-carbamyl maleimide, with at least one other monomer containing a terminal $CH_2=C<$ group, said interpolymer containing from about 5 percent to 50 percent of said amide, substantially all of the nitrogen atoms in said interpolymer being trivalent nitrogen atoms, said interpolymer being characterized by having at least about 50 percent of the amido groups thereof having a hydrogen atom replaced by the structure

wherein R is a member of the class consisting of hydrogen, furyl, and a saturated lower aliphatic hydrocarbon radical, and $R_1$ is a member of the class consisting of alkyl radicals containing from about 1 to 12 carbon atoms, and benzyl radicals.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-15 is confirmed.

* * * * *